US012515254B2

(12) United States Patent
Martinez Suarez et al.

(10) Patent No.: US 12,515,254 B2
(45) Date of Patent: Jan. 6, 2026

(54) PROCESS FOR THE ADDITIVE MANUFACTURING OF MARAGING STEELS

(71) Applicant: ArcelorMittal, Luxembourg (LU)

(72) Inventors: Ana Martinez Suarez, Asturias (ES); Laura Moli, Asturias (ES); Laura Del Rio Fernandez, Asturias (ES); Nele Van Steenberge, Ghent (BE); Lode Duprez, Ghent (BE)

(73) Assignee: ArcelorMittal, Luxembourg (LU)

( * ) Notice: Subject to any disclaimer, the term of this patent is extended or adjusted under 35 U.S.C. 154(b) by 481 days.

(21) Appl. No.: 17/785,733

(22) PCT Filed: Dec. 20, 2019

(86) PCT No.: PCT/IB2019/061158
§ 371 (c)(1),
(2) Date: Jun. 15, 2022

(87) PCT Pub. No.: WO2021/123894
PCT Pub. Date: Jun. 24, 2021

(65) Prior Publication Data
US 2023/0104535 A1   Apr. 6, 2023

(51) Int. Cl.
| | |
|---|---|
| *B22F 10/28* | (2021.01) |
| *B22F 10/32* | (2021.01) |
| *B33Y 10/00* | (2015.01) |
| *B33Y 70/00* | (2020.01) |
| *C22C 38/50* | (2006.01) |
| *B22F 9/08* | (2006.01) |

(52) U.S. Cl.
CPC ............ *B22F 10/28* (2021.01); *B22F 10/32* (2021.01); *C22C 38/50* (2013.01); *B22F 9/082* (2013.01); *B22F 2201/02* (2013.01); *B33Y 10/00* (2014.12); *B33Y 70/00* (2014.12)

(58) Field of Classification Search
None
See application file for complete search history.

(56) References Cited

U.S. PATENT DOCUMENTS

| | | | | |
|---|---|---|---|---|
| 6,238,455 | B1 * | 5/2001 | Brown ................ | C21D 8/065 419/49 |
| 2006/0201593 | A1 | 9/2006 | Inoue et al. | |
| 2013/0174942 | A1 | 7/2013 | Bonnet | |
| 2018/0009031 | A1 * | 1/2018 | Nakamura ........... | B22F 1/10 |
| 2018/0044766 | A1 * | 2/2018 | Tidesten ............. | C22C 38/04 |
| 2018/0105906 | A1 | 4/2018 | Boisvert et al. | |
| 2018/0339341 | A1 | 11/2018 | Tatsumi et al. | |
| 2019/0111477 | A1 | 4/2019 | Maie | |
| 2019/0134707 | A1 * | 5/2019 | Kaneko ............... | B23K 26/082 |
| 2019/0263056 | A1 | 8/2019 | Motoyama et al. | |
| 2019/0355498 | A1 | 11/2019 | Yoshidome et al. | |
| 2020/0147688 | A1 * | 5/2020 | Tenbrink ............. | H01F 1/147 |
| 2020/0391286 | A1 * | 12/2020 | Kuse .................. | B33Y 70/00 |
| 2020/0406533 | A1 * | 12/2020 | Muranaka ........... | B29C 64/268 |
| 2023/0220527 | A1 | 7/2023 | Leitner et al. | |

FOREIGN PATENT DOCUMENTS

| | | | | |
|---|---|---|---|---|
| CN | 1483849 | A | * | 3/2004 |
| CN | 1831181 | A | | 9/2006 |
| CN | 108517473 | A | | 9/2018 |
| CN | 110629131 | A | * | 12/2019 |
| EP | 3533539 | A1 | | 9/2019 |
| JP | H07331379 | A | | 12/1995 |
| JP | 2000026941 | A | | 1/2000 |
| JP | 2001234918 | A | | 8/2001 |
| JP | 2008248389 | A | | 10/2008 |
| JP | 2014105373 | A | * | 6/2014 |
| JP | 2015175026 | A | | 10/2015 |
| JP | 2019073752 | A | | 5/2019 |
| JP | 6611151 | B1 | | 11/2019 |
| WO | WO 2018024892 | A1 | | 2/2018 |
| WO | WO2018230421 | A1 | | 12/2018 |
| WO | WO2019121879 | A1 | | 6/2019 |
| WO | WO-2019139017 | A1 | * | 7/2019 ............... B22F 1/00 |
| WO | WO 2021/123895 | A1 | | 6/2021 |

(Continued)

OTHER PUBLICATIONS

Nezhadfar et al. Mechanical Properties of 17-4 PH Stainless Steel Additively Manufactured under Ar and N2 Shielding Gas. Solid Freeform Fabrication 2018: Proceedings of the 29th Annual International Solid Freeform Fabrication Symposium—An Additive Manufacturing Conference. 1301-1310. (Year: 2018).*
Turk et al. Advances in Maraging Steels for Additive Manufacturing. Berg Huettenmaenn Monatsh. Jan. 31, 2019. (Year: 2019).*
Takata et al. Crystallographic Features of Microstructure in Maraging Steel Fabricated by Selective Laser Melting. Metals 2018, 8, 440. (Year: 2018).*
Bhadeshia and Honeycombe. Steels: Microstructure and Properties. Fourth edition. 2017. Chapter 5 Formation of Martensite. 135-141. (Year: 2017).*
ISR of PCT/IB2019/061160 dated Mar. 7, 2020.
Written opinion of ISA of PCT/IB2020/061160.

(Continued)

*Primary Examiner* — Keith Walker
*Assistant Examiner* — Stephani Hill
(74) *Attorney, Agent, or Firm* — Davidson Kappel LLC

(57) ABSTRACT

A process for manufacturing an additively-manufactured part from a metal powder having a composition having the following elements, expressed in content by weight: 6%≤Ni≤14%, 5%≤Cr≤10%, 0.5%≤Si≤2.5%, 0.5%≤Ti≤2%, C≤0.04% and optionally containing 0.5%≤Cu≤2%, the balance being Fe and unavoidable impurities resulting from the elaboration, the metal powder having a microstructure including in area fraction more than 98% of a body-centered cubic crystalline phase, the process having a step during which at least a part of the metal powder is melted in an atmosphere substantially composed of an inert gas other than Argon or of a combination of inert gases other than Argon.

9 Claims, No Drawings

(56) References Cited

FOREIGN PATENT DOCUMENTS

| WO | WO 2021123894 A1 | 6/2021 |
| WO | WO 2021124069 A1 | 6/2021 |
| WO | WO 2021124229 A1 | 6/2021 |

OTHER PUBLICATIONS

ISR of PCT/IB2019/062159 dated Dec. 3, 2021.
Written opinion of ISA of PCT/IB2020/062159.
Garibaldi Michele et al, "Metallurgy of high-silicon steel parts produced using Selective Laser Melting", ACTA Materialia, Elsevier, Oxford, GB, (Mar. 22, 2016), vol. 110, doi:10.1016/J.ACTAMAT.2016.03.037, ISSN 1359-6454, pp. 207-216.
Tiismus Hans et al, "Axial Synchronous Magnetic Coupling Modeling and Printing with Selective Laser Melting", 2019 IEEE 60th International Scientific Conference on Power and Electrical Engineering of Riga Technical University (RTUCON), IEEE, (Oct. 7, 2019).
ISR of PCT/IB2019/061889 dated May 3, 2021.
Written opinion of ISA of PCT/IB2020/061889.
Chengsong Cui et al, "Austenitic Stainless Steel Powders with Increased Nitrogen Content for Laser Additive Manufacturing", Metals, (Dec. 30, 2019), vol. 10, No. 1.
ISR of PCT/IB2019/061158 dated Jul. 22, 2020.
Written opinion of ISA of PCT/IB2020/061158.

\* cited by examiner

PROCESS FOR THE ADDITIVE MANUFACTURING OF MARAGING STEELS

The present invention relates to a process for the manufacturing of maraging steels and in particular for their additive manufacturing. The present invention also relates to the metal powder for manufacturing the maraging steels.

SUMMARY OF THE INVENTION

Numerous parts are manufactured from maraging steel strips containing, in percentage by weight, about 18% of nickel, 9% of cobalt, 5% of molybdenum, 0.5% of titanium and 0.1% of aluminum, and having been treated to achieve an elastic limit of greater than 1800 MPa. These strips are obtained by hot rolling and cold rolling. The strips or parts cut out of the strips are then hardened by heat treatment at around 500° C. Unfortunately, the part shapes obtainable through this process are somehow limited.

An object of the present invention is therefore to remedy the drawbacks of the prior art by providing a process for the additive manufacturing of maraging steels.

For this purpose, a first subject of the present invention consists of a process for manufacturing an additively-manufactured part from a metal powder having a composition comprising the following elements, expressed in content by weight:

$6\% \leq Ni \leq 14\%$ $5\% \leq Cr \leq 10\%$ $0.5\% \leq Si \leq 2.5\%$ $0.5\% \leq Ti \leq 2\%$ $C \leq 0.04\%$ and optionally containing:

$0.5\% \leq Cu \leq 2\%$ the balance being Fe and unavoidable impurities resulting from the elaboration,
the metal powder having a microstructure including in area fraction more than 98% of a body-centered cubic crystalline phase,
the process comprising a step during which at least a part of the metal powder is melted in an atmosphere substantially composed of an inert gas other than Argon or of a combination of inert gases other than Argon.

The process according to the invention may also have the optional features listed below, considered individually or in combination:
the inert gas other than Argon is Nitrogen,
the atmosphere comprises less than 1000 ppm of oxygen,
the inert gas other than Argon or the combination of inert gases other than Argon are in a hermetically sealed chamber,
the additively-manufactured part is manufactured by Laser Powder Bed Fusion (LPBF),
the laser power is between 80 and 200 W,
the Linear Energy Density (LED) is comprised between 175 and 550N,
the Volumetric Energy Density (VED) is comprised between 100 and 510 J/mm$^3$.

Other characteristics and advantages of the invention will be described in greater detail in the following description.

The invention will be better understood by reading the following description, which is provided purely for purposes of explanation and is in no way intended to be restrictive.

Nickel is present in the composition according to the invention at a content of 6 to 14 wt %. At least 6 wt % of Ni are needed to obtain the fully martensitic structure of the final part. Above 14 wt %, retained austenite tends to form, which leads to lower strengths.

The Chromium content is comprised between 5 and 10 wt % to improve the corrosion resistance of the steel.

The Silicon content is comprised between 0.5 and 2.5 wt % to ensure the precipitation of the G-phase. Above 2.5 wt %, Si tends to prevent the austenite formation at high temperature and thus the martensite formation.

The Titanium content is comprised between 0.5 and 2 wt %. At least 0.5 wt % is needed to ensure precipitation strengthening. Ti is limited to 2 wt % for productivity reasons.

Carbon is maintained below 0.04 wt % to avoid the formation of titanium carbides which severely reduce the impact strength, ductility and toughness. Preferably, C content is below 0.015 wt %.

Optionally, Copper is added at a content comprised between 0.5 and 2 wt %. The combination of Ti with more than 0.5 wt % of Cu further improve the precipitation strengthening. It is believed that Cu-rich clusters enhance the co-precipitation of other intermetallics in particular the precipitation of G-phase.

The balance is made of iron and unavoidable impurities resulting from the elaboration. Aluminum, Arsenic, Bismuth, Cadmium, Cobalt, Magnesium, Manganese, Nitrogen, Phosphorus, Lead, Sulfur, Antimony, Tin, Oxygen, Vanadium are the main impurities. They are not deliberately added. They might be present in the ferroalloys and/or pure elements used as raw materials. Their content is preferably controlled to avoid changing detrimentally the microstructure and/or to avoid increasing the grain size and brittleness. Therefore, the content of each impurity should be limited to 0.05 wt %.

The metal powder has a microstructure comprising in area fraction more than 98% of a body-centered cubic crystalline phase. This phase can be martensite and/or ferrite. It can be measured by XRD or by Electron Beam Backscatter Diffraction (EBDS).

The sphericity of the powder is high. The sphericity SPHT can be measured by a Camsizer and is defined in ISO 9276-6 as $4\pi A/P^2$, where A is the measured area covered by a particle projection and P is the measured perimeter/circumference of a particle projection. A value of 1.0 indicates a perfect sphere. The mean sphericity of the powder is at least 0.75. Thanks to this sphericity, the metal powder is flowable enough. Consequently, the additive manufacturing is made easier.

Preferably, at least 80% of the metal powder particles have a size in the range of 20 μm to 260 μm.

The particle size distribution, measured by laser diffraction according to ISO13320:2009 or ASTM B822-17, preferably fulfils the following requirements (in μm):

$25 \leq D10 \leq 35$
$80 \leq D50 \leq 100$
$170 \leq D90 \leq 280$

The metal powder has a good flowability with a Hausner ratio below 1.25 and a Carr Index below 21%. Hausner ratio (tapped density/bulk density) and Carr Index ((tapped density−bulk density)/tapped density×100%) are obtained from a tap density measured according to ASTM B527-15; ISO 3953:2011.

The powder can be obtained by first mixing and melting pure elements and/or ferroalloys as raw materials.

Pure elements are usually preferred to avoid having too much impurities coming from the ferroalloys, as these impurities might ease the crystallization. Nevertheless, in the case of the present invention, it has been observed that the impurities coming from the ferroalloys were not detrimental to the achievement of the microstructure.

Ferroalloys refer to various alloys of iron with a high proportion of one or more other elements such as chromium, aluminum, manganese, molybdenum, Silicon, Titanium . . . . The main alloys are FeAl (usually comprising 40 to 60 wt % Al), FeB (usually comprising 17.5 to 20 wt % B), FeCr (usually comprising 50 to 70 wt % Cr), FeMg, FeMn, FeMo (usually comprising 60 to 75 wt % Mo), FeNb (usually comprising 60 to 70 wt % Nb), FeNi, FeP, FeSi (usually comprising 15 to 90 wt % Si), FeSiMg, FeTi (usually comprising 45 to 75 wt % Ti), FeV (usually comprising 35 to 85 wt % V), FeW (usually comprising 70 to 80 wt % Mo).

Pure elements can notably be pure metals such as iron, copper, nickel.

The person skilled in the art knows how to mix different ferroalloys and pure elements to reach a targeted composition.

Preferably the mix comprises FeCr ferroalloy, FeSi ferroalloy, FeTi ferroalloy, Cu, Ni and Fe.

Once the composition has been obtained by the mixing of the pure elements and/or ferroalloys in appropriate proportions, the composition is heated at a temperature at least 210° C. above its liquidus temperature. Thanks to this overheating, the solidification of the melt in the crucible is avoided. Moreover, the decrease in viscosity of the melted composition helps obtaining a powder with a high sphericity without satellites, with a proper particle size distribution, along with its specific structure. That said, as the surface tension increases with temperature, it is preferred not to heat the composition at a temperature more than 350° C. above its liquidus temperature.

Preferably, the composition is heated at a temperature 215 to 250° C. above its liquidus temperature.

In one variant of the invention, the composition is heated between 1640 and 1720° C. which represents a good compromise between viscosity decrease and surface tension increase.

The molten composition is then atomized into fine metal droplets by forcing a molten metal stream through an orifice, the nozzle, at moderate pressures and by impinging it with jets of gas (gas atomization) or of water (water atomization). In the case of the gas atomization, the gas is introduced into the metal stream just before it leaves the nozzle, serving to create turbulence as the entrained gas expands (due to heating) and exits into a large collection volume, the atomizing tower. The latter is filled with gas to promote further turbulence of the molten metal jet. The metal droplets cool down during their fall in the atomizing tower. Gas atomization is preferred because it favors the production of powder particles having a high degree of roundness and a low amount of satellites.

The atomization gas is preferably argon or nitrogen. They both increase the melt viscosity slower than other gases, e.g. helium, which promotes the formation of smaller particle sizes. They also control the purity of the chemistry, avoiding undesired impurities, and play a role in the good morphology of the powder. Finer particles can be obtained with argon than with nitrogen since the molar weight of nitrogen is 14.01 g/mole compared with 39.95 g/mole for argon. On the other hand, the specific heat capacity of nitrogen is 1.04 J/(g K) compared with 0.52 for argon. So, nitrogen increases the cooling rate of the particles. Nitrogen is preferred in the present case as it could improve the formation of TiN nano-precipitates through nitrogen uptake by the powder.

The gas pressure is of importance since it directly impacts the particle size distribution and the microstructure of the metal powder. In particular, the higher the pressure, the higher the cooling rate. Consequently, the gas pressure is set between 15 and 30 bar to optimize the particle size distribution and favor the formation of the microstructure. Preferably, the gas pressure is set between 18 and 22 bar to promote the formation of particles whose size is most compatible with the additive manufacturing techniques.

The nozzle diameter has a direct impact on the molten metal flow rate and, thus, on the particle size distribution and on the cooling rate. The maximum nozzle diameter is limited to 4 mm to limit the increase in mean particle size and the decrease in cooling rate. The nozzle diameter is preferably between 2.5 and 3.5 mm to more accurately control the particle size distribution and favor the formation of the specific microstructure.

According to one variant of the invention, in the event of humidity uptake, the metal powder obtained by atomization is dried to further improve its flowability. Drying is preferably done between 50° C. and 100° C. in a vacuum chamber for one hour.

The metal powder obtained by atomization can be either used as such or can be sieved to keep the particles whose size better fits the additive manufacturing technique to be used afterwards. For example, in case of additive manufacturing by Laser Powder Bed Fusion, the range 20-63 µm is preferred. In the case of additive manufacturing by Laser Metal Deposition or Direct Metal Deposition, the range 45-150 µm is preferred.

The parts made of the metal powder according to the invention can be obtained by additive manufacturing techniques such as Laser Powder Bed Fusion (LPBF), Direct metal laser sintering (DMLS), Electron beam melting (EBM), Selective heat sintering (SHS), Selective laser sintering (SLS), Laser Metal Deposition (LMD), Direct Metal Deposition (DMD), Direct Metal Laser Melting (DMLM), Direct Metal Printing (DMP), Laser Cladding (LC), Material Jetting, Binder Jetting, Fused Deposition Modeling (FDM).

It has been surprisingly observed that the parts obtained by additive manufacturing present a relative density which strongly varies depending on the inert gas(es) used during the manufacturing process. By inert gas, it is meant notably nitrogen, helium, neon, argon, krypton, xenon and radon, knowing that the inert gas or the combination of inert gases can comprise up to 1000 ppm of O2, as residual impurity at the end of the inertization step. In particular, as soon as Ar is used as inert gas or added as part of a mix of inert gases, the relative density of the manufactured parts decreases. More particularly, replacing $N_2$ by Ar strongly affects the relative density, all other process parameters being equal.

Preferably, all the metal powder melted during the manufacturing process is melted in an atmosphere substantially composed of an inert gas other than Argon or of a combination of inert gases other than Argon. In other words, all the steps during which at least a part of the metal powder is melted are performed in an atmosphere substantially composed of an inert gas other than Argon or of a combination of inert gases other than Argon.

Depending on the technology used, the inert gas can be in the hermetically sealed chamber used during the manufacturing process, if any, or it can shroud the melt pool.

This surprising result has notably been observed when manufacturing the parts by Laser Powder-Bed Fusion (LPBF).

LPBF is a layer-upon-layer additive manufacturing technique. Thin layers of metal powder are evenly distributed using a coating mechanism onto a substrate platform, usually metal, that is fastened to an indexing table that moves in the vertical (Z) axis. This takes place inside a chamber containing a tightly controlled atmosphere. Once each layer has been distributed, each 2D slice of the part geometry is fused by selectively melting the powder. This is accomplished with a high-power laser beam, usually an ytterbium fiber laser. The laser energy is intense enough to permit full melting (welding) of the particles in the form of a track or strip. Basically, once a track is done, the process is repeated with the next track, which is separated from the first one by the hatch spacing (h). The process is repeated layer after layer until the part is complete. The overhanging geometry is supported by unmelted powder from previous layers. The main process parameters used in LPBF are schematically the layer thickness, the hatch spacing, the scan speed and the laser power. After completing the process, the left-over powder is screened to be reused.

The process for manufacturing an additively-manufactured part by Laser Powder Bed Fusion (LPBF) comprises a first step of forming a powder layer with the powder according to the invention. Preferably the powder layer is less than 40 µm. Above 40 µm, the laser might not melt the powder in all the layer thickness, which might lead to porosity in the part. Preferably, the layer thickness is kept between 10 and 30 µm to optimize the melting of the powder.

In a second step, a focused laser beam forms a shaped layer by melting at least part of the powder layer in the process conditions detailed below.

In the case of LPBF, each layer of the printed part is at least partially melted in an atmosphere substantially composed of an inert gas other than Argon or of a combination of inert gases other than Argon. In other words, the process comprises a step during which a focused laser beam forms successive shaped layers by melting at least part of the metal powder in an atmosphere substantially composed of an inert gas other than Argon or of a combination of inert gases other than Argon.

The laser power is preferably limited to maximum 200W. Preferably, the laser power is set above 80W to ease the melting in all the layer thickness. Preferably, the laser spot is around 55 µm wide.

The scan speed is preferably comprised between 300 and 1000 mm/s. Below 300 mm/s, the excess energy provided by the laser might lead to spatters which, if not properly drag outside of the powder bed, deposit on the powder layer which create voids in the printed part. Above 1000 mm/s, the energy provided by the laser to the powder might not be enough to melt the powder in all the layer thickness. More preferably, the scan speed is comprised between 0.4 and 0.9 m/s which further improves the quality of the printed parts.

The Linear Energy Density (LED) is preferably comprised between 160 and 890N. LED is defined as the ratio between the laser power and the scan speed expressed in m/s. Below 160N, LED might not be enough to properly print parts (due to keyholing). Above 890N, the excess energy provided by the laser might lead to spatters which, if not properly drag outside of the powder bed, deposit on the powder layer. Such deposits create voids in the printed part. LED is more preferably comprised between 180 and 550, and even more preferably between 200 and 425, so as to further limit the occurrence of keyholing, balling and spatters.

The gas flow rate of the inert gas introduced in the chamber is preferably above 2 m/s so that the possible spatters generated to the powder melting are efficiently dragged out of the powder bed. Porosity in the printed part is thus avoided. More preferably, the gas flow rate is comprised between 2 and 3.5 m/s.

The hatch spacing is preferably comprised between 30 and 100 µm. Below 30 µm, each point of the printed part might be remelted multiple times which might lead to overheating. Above 100 µm, unmelted powder might be trapped between two tracks. More preferably, the hatch spacing is comprised between 70 and 100 µm.

The Volumetric Energy Density (VED) is preferably comprised between 100 and 510 J/mm$^3$ and more preferably between 120 and 400 J/mm$^3$. VED is defined as $P/(v \cdot h \cdot l_t)$, where P is the laser power, v is the scan speed, h is the hatch spacing and $l_t$ is the powder layer thickness. Such VED further helps avoiding voids in the printed part. It also helps avoiding overheating which could cause hot cracking.

EXAMPLES

The following examples and tests presented hereunder are non-restricting in nature and must be considered for purposes of illustration only. They will illustrate the advantageous features of the present invention, the significance of the parameters chosen by inventors after extensive experiments and further establish the properties that can be achieved by the process according to the invention.

Powder Ref 1:

Pure elements were mixed so as to obtain a composition comprising 1.15 wt % Si, 0.56 wt % Ti, 0.97 wt % Cu, 7.55 wt % Cr, 7.07 wt % Ni, 0.013 wt % C, the balance being Fe and unavoidable impurities resulting from the elaboration. The composition was heated at a temperature 215° C. above its liquidus temperature (i.e. at 1685° C.) and then atomized by gas atomization in $N_2$ at 20 bar, with a nozzle diameter of 3 mm.

The metal powder obtained had a sphericity of 0.79 and a particle size distribution such that $D_{10}$=27.3 µm, $D_{50}$=70.4 µm and $D_{90}$=179.7 µm. The metal powder had a good flowability with a Hausner ratio of 1.129 and a Carr Index of 11.012%.

Powder Ref 2:

Ferroalloys and pure elements were mixed so as to obtain a composition comprising 0.97 wt % Si, 0.85 wt % Ti, 1.00 wt % Cu, 7.73 wt % Cr, 7.15 wt % Ni, 0.038 wt % C, the balance being Fe and unavoidable impurities resulting from the elaboration. The composition was heated at a temperature 215° C. above its liquidus temperature (i.e. at 1683° C.) and then atomized by gas atomization in $N_2$ at 20 bar, with a nozzle diameter of 3 mm.

The metal powder obtained had a sphericity of 0.82 and a particle size distribution such that $D_{10}$=32.4 µm, $D_{50}$=92.7 µm and $D_{90}$=250.8 µm. The metal powder had an excellent flowability with a Hausner ratio of 1.098 and a Carr Index of 9.856%.

Powder Ref 3:

Ferroalloys and pure elements were mixed so as to obtain a composition comprising 0.95 wt % Si, 0.77 wt % Ti, 1.06 wt % Cu, 7.97 wt % Cr, 7.11 wt % Ni, 0.026 wt % C, the balance being Fe and unavoidable impurities resulting from the elaboration. The composition was heated at a temperature 236° C. above its liquidus temperature (i.e. at 1698° C.) and then atomized by gas atomization in $N_2$ at 20 bar, with a nozzle diameter of 3 mm.

The metal powder obtained had a sphericity of 0.77 and a particle size distribution such that $D_{10}$=30.8 μm, $D_{50}$=89.8 μm and $D_{90}$=246.2 μm. The metal powder had a good flowability with a Hausner ratio of 1.109 and a Carr Index of 11.12%.

F2 fractions (i.e. particles between 20 and 63 μm) of powders referenced 1 to 3 were then used to manufacture parts by LPBF in the process conditions detailed in Table 1 and with a layer thickness of 20 μm.

Relative density of the printed parts was measured by first measuring the absolute density by Archimedes method according to ISO3369:2006 and then by calculating the ratio between the absolute density and the theoretical density of the material (possibly obtained from a part casted with the same composition than the printed parts).

As it is apparent from the relative density values obtained, the parts manufactured under $N_2$ present a very good relative density whatever the process conditions. As soon as Ar is used as inert gas, the relative density of the parts strongly decreases.

TABLE 1

| Ex # | Powder ref | Inert gas | Power (W) | Speed (mm) | LED (N) | Hatch (mm) | VED (J/mm³) | Relative density |
|---|---|---|---|---|---|---|---|---|
| 1* | 1 | N2 | 170 | 800 | 213 | 0.09 | 118 | 99.56% |
| 2* | 1 | N2 | 200 | 700 | 286 | 0.09 | 159 | 99.56% |
| 3* | 1 | N2 | 200 | 700 | 286 | 0.07 | 205 | 99.86% |
| 4* | 1 | N2 | 200 | 500 | 400 | 0.08 | 250 | 99.75% |
| 5* | 1 | N2 | 200 | 400 | 500 | 0.08 | 312 | 99.74% |
| 6* | 1 | N2 | 200 | 400 | 500 | 0.07 | 357 | 99.85% |
| 7* | 2 | N2 | 175 | 900 | 194 | 0.08 | 122 | 99.90% |
| 8 | 2 | Ar | 175 | 900 | 194 | 0.08 | 122 | 97.86% |
| 9* | 2 | N2 | 185 | 800 | 231 | 0.08 | 145 | 99.58% |
| 10* | 2 | N2 | 185 | 600 | 308 | 0.08 | 193 | 99.39% |
| 11* | 2 | N2 | 200 | 500 | 400 | 0.08 | 250 | 99.42% |
| 12* | 2 | N2 | 170 | 400 | 425 | 0.07 | 304 | 99.61% |
| 13* | 3 | N2 | 150 | 400 | 375 | 0.08 | 234 | 99.58% |
| 14 | 3 | Ar | 150 | 400 | 375 | 0.08 | 234 | 98.99% |
| 15* | 3 | N2 | 170 | 400 | 425 | 0.07 | 304 | 99.48% |
| 16 | 3 | Ar | 170 | 400 | 425 | 0.07 | 304 | 98.36% |
| 17* | 3 | N2 | 175 | 1000 | 175 | 0.07 | 124 | 99.06% |
| 18 | 3 | Ar | 175 | 1000 | 175 | 0.07 | 124 | 98.52% |
| 19* | 3 | N2 | 175 | 300 | 583 | 0.10 | 307 | 99.23% |
| 20 | 3 | Ar | 175 | 300 | 583 | 0.10 | 307 | 98.86% |
| 21* | 3 | N2 | 175 | 200 | 875 | 0.09 | 505 | 99.19% |
| 22 | 3 | Ar | 175 | 200 | 875 | 0.09 | 505 | 98.82% |
| 23* | 3 | N2 | 200 | 900 | 222 | 0.06 | 179 | 99.19% |
| 24 | 3 | Ar | 200 | 900 | 222 | 0.06 | 179 | 98.73% |

*according to the invention

What is claimed is:

1. A method for manufacturing an additively-manufactured part from a metal powder having a composition consisting of the following elements, expressed in content by weight:

6%≤Ni≤14%

5%≤Cr≤10%

0.5%≤Si≤2.5%

0.5%≤Ti≤2%

C≤0.04% and optionally including:

0.5%≤Cu≤2% a balance being Fe and unavoidable impurities resulting from processing,
   the metal powder having a microstructure including in area fraction more than 98% of a body-centered cubic crystalline phase, the method comprising:
   melting at least a part of the metal powder in an atmosphere substantially composed of nitrogen,
   the additively-manufactured part having a relative density of from 99.06% to 99.90%.

2. The method of claim 1, wherein an amount of each impurity is 0.05 wt % or less.

3. The method of claim 1, wherein the content of Si in the composition 0.95%≤Si≤2.5%.

4. The method of claim 1, wherein the impurities are selected from a group consisting of aluminum, arsenic, bismuth, cadmium, cobalt, magnesium, manganese, nitrogen, phosphorus, lead, sulfur, antimony, tin, oxygen, and vanadium.

5. The method as recited in claim 1 wherein the atmosphere comprises less than 1000 ppm of oxygen.

6. The method as recited in claim 1 wherein the additively-manufactured part is manufactured by Laser Powder Bed Fusion (LPBF).

7. The method as recited in claim 6 wherein a laser power is between 80 and 200 W.

8. The method as recited in claim 6 wherein a Linear Energy Density (LED) is comprised between 175 and 550N.

9. The method as recited in claim 6 wherein a Volumetric Energy Density (VED) is comprised between 100 and 510 J/mm³.

* * * * *